(12) United States Patent
Maidee et al.

(10) Patent No.: US 10,534,729 B1
(45) Date of Patent: Jan. 14, 2020

(54) METHOD AND APPARATUS FOR INTER-DIE DATA TRANSFER

(71) Applicant: Xilinx, Inc., San Jose, CA (US)

(72) Inventors: Pongstorn Maidee, San Jose, CA (US); Theepan Moorthy, New York, NY (US)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 15/979,044

(22) Filed: May 14, 2018

(51) Int. Cl.
*G06F 13/00* (2006.01)
*G06F 13/16* (2006.01)
*G06F 1/04* (2006.01)
*G06F 13/42* (2006.01)

(52) U.S. Cl.
CPC .............. *G06F 13/161* (2013.01); *G06F 1/04* (2013.01); *G06F 13/4239* (2013.01); *G06F 13/4291* (2013.01)

(58) Field of Classification Search
CPC ...... G06F 13/161; G06F 1/04; G06F 13/4239; G06F 13/4291
USPC ........................................................ 710/100
See application file for complete search history.

(56) References Cited

U.S. PATENT DOCUMENTS

| 6,359,815 | B1* | 3/2002 | Sato ..................... | G11C 7/1006 365/198 |
| 2012/0176168 | A1* | 7/2012 | Tso ....................... | H03L 7/0812 327/145 |
| 2018/0122486 | A1* | 5/2018 | Choi ..................... | G11C 7/222 |

OTHER PUBLICATIONS

Lodhi, Faiq Khalid et al., "Timing Variation Aware Dynamic Digital Phase Detector For Low-Latency Clock Domain Crossing," IET Circuits, Devices & Systems, Jan. 16, 2014, vol. 8, Iss. 1, pp. 58-64, IEEE, Piscataway, New Jersey, USA.

\* cited by examiner

*Primary Examiner* — Chun Kuan Lee
(74) *Attorney, Agent, or Firm* — Hong Shi

(57) ABSTRACT

An inter-die data transfer system includes a receiver circuit in a receiver die coupled to a sender circuit in a sender die through a bus. The receiver circuit includes a safe sample selection circuit and a latency adjustment circuit. The safe sample selection circuit receives from the sender circuit a plurality of training data signals, and determines a safe sample selection signal for a first bit of the bus. The latency adjustment circuit determines a latency adjustment selection signal for the first bit of the bus. A user data safe sample is selected using the safe sample selection signal from a plurality of user data samples associated with a first user data input signal associated with the first bit of the bus. Latency adjustment is performed to the user data safe sample to generate a first user data output signal using the latency adjustment selection signal.

20 Claims, 11 Drawing Sheets

METHOD AND APPARATUS FOR INTER-DIE DATA TRANSFER

TECHNICAL FIELD

Examples of the present disclosure generally relate to integrated circuits ("ICs") and, in particular, to an embodiment related to data transfer between dies.

BACKGROUND

For inter-die data transfers, a synchronous system is often used. To guard against timing failure from the process, voltage, and temperature (PVT) variations between the two dies, various factors including, for example, inter-die compensation, clock skew, and uncertainty, affect the timing budget for synchronous circuits. As a result, the crossing frequency for the inter-die data transfer is limited. On the other hand, existing asynchronous die crossing systems usually use additional crossing wires and has a low throughput to provide asynchronous clock domain crossings. For example, a reliable clock domain crossing for a bus usually uses a handshake that reduces throughput. For further example, an asynchronous first-in first out buffer (FIFO) used for clock crossing may need more wires for addressing when that asynchronous FIFO is divided into two dies. Such asynchronous die crossing systems may also require a data width that is fixed in advance.

Accordingly, it would be desirable and useful to provide an improved inter-die data transfer system.

SUMMARY

In some embodiments, an inter-die data transfer system includes a receiver circuit in a receiver die, wherein the receiver circuit includes a safe sample selection circuit and a latency adjustment circuit. The safe sample selection circuit is configured to: receive, through a bus from a sender circuit in a sender die, a plurality of training data signals corresponding to a plurality of bits of the bus respectively; determine a safe sample selection signal based on a first training data signal corresponding to a first bit of the bus; receive, through the bus, a plurality of user data input signals from the sender circuit corresponding to the plurality of bits of the bus respectively; and select, using the first safe sample selection signal, a user data safe sample from a plurality of user data samples for a first user data input signal associated with the first bit of the bus. The latency adjustment circuit is configured to: determine a latency adjustment selection signal associated with the first bit of the bus based on the plurality of training data signals; and perform latency adjustment to the user data safe sample to generate a first user data output signal using the latency adjustment selection signal.

In some embodiments, the safe sample selection circuit further includes: a sampling circuit configured to: sample a first training data symbol of the first training data signal at a plurality of sampling times to generate a plurality of training data samples; wherein the safe sample selection signal is determined using the plurality of training data samples.

In some embodiments, the plurality of sampling times includes a first sampling time and a second sampling time adjacent to the first sampling time, and a first time period between the first and second sampling times is determined based on a metastability limitation of the plurality of training data samples.

In some embodiments, at most one of the plurality of training data samples is metastable.

In some embodiments, the sampling circuit includes a first register configured to generate a first training data sample at the first sampling time, and the first time period is greater than a combined time of a setup time of the first register and a hold time of the first register.

In some embodiments, the safe sample selection circuit includes: a stabilizer circuit configured to stabilize the plurality of training data samples to generate a plurality of stabilized training data samples. The safe sample selection signal is determined using the plurality of stabilized training data samples.

In some embodiments, the stabilizer circuit includes: a plurality of delay elements connected in serial to obtain valid binary values of the plurality of training data samples.

In some embodiments, the safe sample selection signal is determined based on the first training data signal having a first pattern, and the latency adjustment selection signal is determined based on the first training data signal having a second pattern.

In some embodiments, the first pattern toggles once every clock cycle; and the second pattern toggles once every two or more clock cycles.

In some embodiments, the latency adjustment circuit is configured to: receive a first training data safe sample for a first training data symbol of the first training data signal; receive a second training data safe sample for a second training data symbol of a second training data signal corresponding to a second bit of the bus; and determine the latency adjustment selection signal by detecting a latency difference between the first training data safe sample and the second training data safe sample.

In some embodiments, a method includes receiving, by a receiver circuit in a receiver die through a bus from a sender circuit in a sender die, a plurality of training data signals corresponding to a plurality of bits of the bus respectively; determining, by a safe sample selection circuit of the receiver circuit, a safe sample selection signal based on a first training data signal corresponding to a first bit of the bus; determining a latency adjustment selection signal associated with the first bit of the bus based on the plurality of training data signals; receiving, by the receiver circuit through the bus from the sender circuit, a plurality of user data input signals corresponding to the plurality of bits of the bus respectively; selecting, using the safe sample selection signal, a user data safe sample from a plurality of user data samples for a first user data input signal associated with the first bit of the bus; and performing latency adjustment to the user data safe sample to generate a first user data output signal associated with the first bit of the bus using the latency adjustment selection signal.

In some embodiments, the determining the safe sample selection signal further includes: sampling a first training data symbol of the training data signal at a plurality of sampling times to generate a plurality of training data samples; wherein the safe sample selection signal is determined using the plurality of training data samples.

In some embodiments, the plurality of sampling times includes a first sampling time and a second sampling time adjacent to the first sampling time, and a first time period between the first and second sampling times is determined based on based on a metastability limitation of the plurality of training data samples.

In some embodiments, a first register is configured to generate a first training data sample at the first sampling time, and the first time period is greater than a combined time of a setup time of the first register and a hold time of the first register.

In some embodiments, the determining the safe sample selection signal further includes: stabilizing the plurality of training data samples to generate a plurality of stabilized training data samples; wherein the safe sample selection signal is determined using the plurality of stabilized training data samples.

In some embodiments, the stabilizing the plurality of training data samples includes: obtaining valid binary values of the plurality of training data samples using a plurality of delay elements connected in serial.

In some embodiments, the safe sample selection signal is determined based on the first training data signal having a first pattern, and wherein the latency adjustment selection signal is determined based on the first training data signal having a second pattern.

In some embodiments, the first pattern toggles once every clock cycle; and the second pattern toggles once every two or more clock cycles.

In some embodiments, the determining the latency adjustment selection signal includes: receiving a first training data safe sample for a first training data symbol of the first training data signal; receiving a second training data safe sample for a second training data symbol of a second training data signal corresponding to a second bit of the bus; and determining the latency adjustment selection signal by detecting a latency difference between the first training data safe sample and the second training data safe sample.

Other aspects and features will be evident from reading the following detailed description and accompanying drawings.

DETAILED DESCRIPTION

Figure 1:
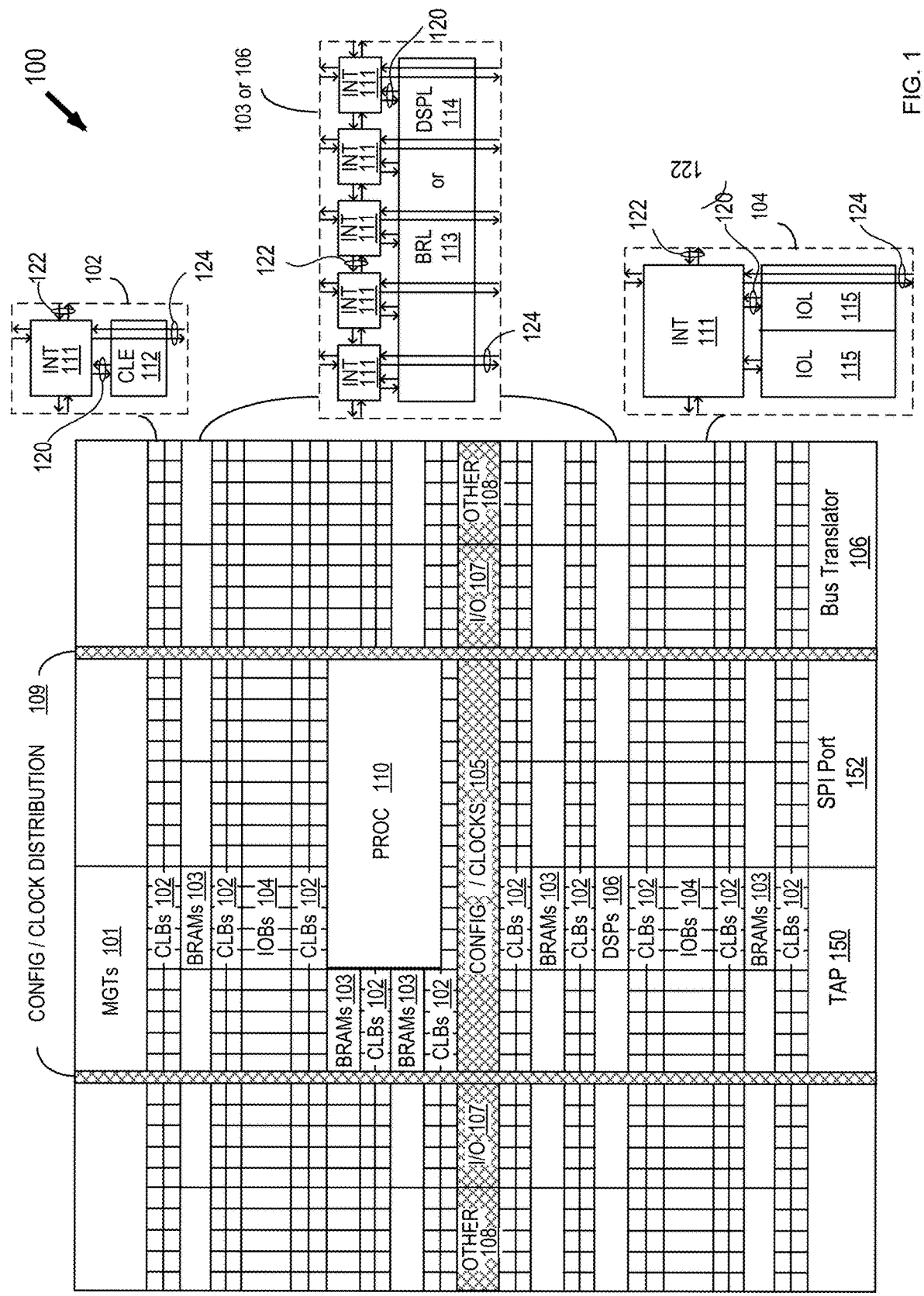
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. As discussed above, the existing inter-die transfer systems may have some limitations. For example, in an existing synchronous inter-die data transfer system, a source register at a source die and a target register at a target die are clocked using the same clock signal. Various factors including for example, inter-die compensation, clock skew, and clock uncertainty, affect the timing budget for such a synchronous inter-die data transfer system, which usually has a limited crossing frequency. Further, because the clock path for a clock signal spans both the source die and the target die, such a synchronous inter-die data transfer system may not take full advantage of geometry partitioning. For further example, an existing conventional asynchronous inter-die data transfer system usually has a variable latency, uses additional crossing wires, requires a fixed bus width, and/or has a low throughput caused by handshake. For integrated circuit (IC) solutions, it has been discovered that, by using a bit-wise asynchronous inter-die data transfer system implementing a training phase before transferring user data, inter-die data transfer with a high crossing frequency, a fixed latency, a configurable bus width, and a high throughput may be achieved. In some embodiments, such bit-wise asynchronous inter-die data transfer system may be implemented without using additional crossing wires or handshake between the two dies.

Various advantages may be present in various applications of the present disclosure. No particular advantage is required for all embodiments, and different embodiments may offer different advantages. One of the advantages of some embodiments is that by using bit-wise asynchronous inter-die data transfer, the inter-die data transfer system may be assembled into a bus of any widths (e.g., 1-bit, 2-. In an example, the bus width may be configurable when the inter-die data transfer system is implemented on programmable logic devices (PLDs). Another advantage of some embodiments is that by performing a training phase before transferring user data, inter-die data transfer with a high reliability, a high crossing frequency, a fixed latency, a configurable bus width, and a high throughput may be achieved without the use of additional crossing wires. For example, because training controllers on the sender die and receiver die respectively are used, no handshaking between the sender die and receiver die is required for determining training completion, thereby improving throughput. Yet another advantage of some embodiments is that the bit-wise asynchronous inter-die data transfer system may coexist with a synchronous inter-die data transfer system, and the bit-wise asynchronous inter-die data transfer system may be implemented using either programmable or non-programmable circuits.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the various embodiments described herein is not limited to the exemplary IC depicted in FIG. 1, and that IC having other configurations, or other types of IC, may also implement the one or more embodiments described herein.

Figure 2:
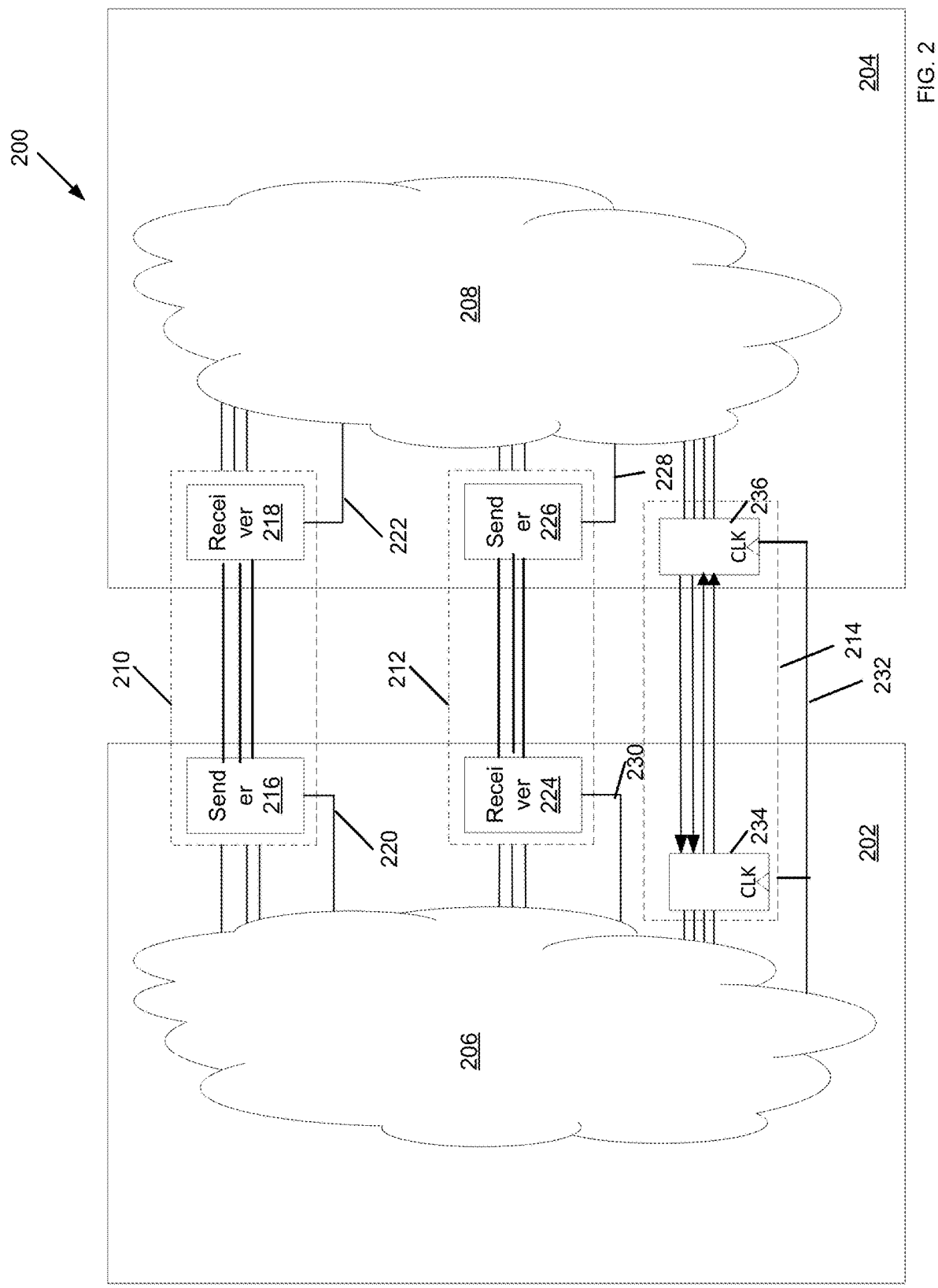
FIG. 2 is a block diagram illustrating an inter-die data transfer system according to some embodiments of the present disclosure.

Referring to the example of FIG. 2, illustrated is an inter-die data transfer system 200 using buses for transferring data between two dies. In the example of FIG. 2, a circuit 206 of a die 202 and a circuit 208 of a die 204 transfer data to each other using buses 210, 212, and 214. Buses 210 and 212 are asynchronous buses. For example, a sender circuit 216 of the bus 210 is located on the die 202, and uses a clock signal 220 (e.g., provided by the circuit 206). A receiver circuit 218 of the bus 210 is located on the die 204, and uses a clock signal 222 (e.g., provided by the circuit 208). As such, the sender circuit 216 and receiver circuit 218 of the asynchronous bus 210 may use different clock signals 220 and 222 respectively. Similarly, a sender circuit 226 and a receiver circuit 224 of an asynchronous bus 212 may use different clock signals 228 and 230 respectively. Each of the asynchronous buses 210 and 212 may not require a common clock signal to be shared between its sender and receiver circuit, and parts (e.g., the sender and receiver circuits) coupled to the asynchronous bus may use their own clocks to process incoming/outgoing data.

In the example of FIG. 2, the bus 214 is a synchronous bus that may transfer data between two dies using a clock 232 that is shared by its sender circuit 234 (e.g., including a flip-flop) and receiver circuit 236 (e.g., including a flip-flop). The clock 232 is used to synchronize the timing of both the sender circuit 234 and receiver circuit 236.

Referring to FIGS. 3 through 11, in various embodiments, an asynchronous inter-die data transfer system is configured to operate in a training phase and a running phase for inter-die data transfer, which enables the asynchronous inter-die data transfer system to perform asynchronous inter-die data transfer with a fixed latency, a high throughput, and configurable bus widths. Such an asynchronous inter-die data transfer system may be realized without using additional wires that are required by a traditional asynchronous inter-die system that using an asynchronous FIFO divided into two dies.

Figure 3:
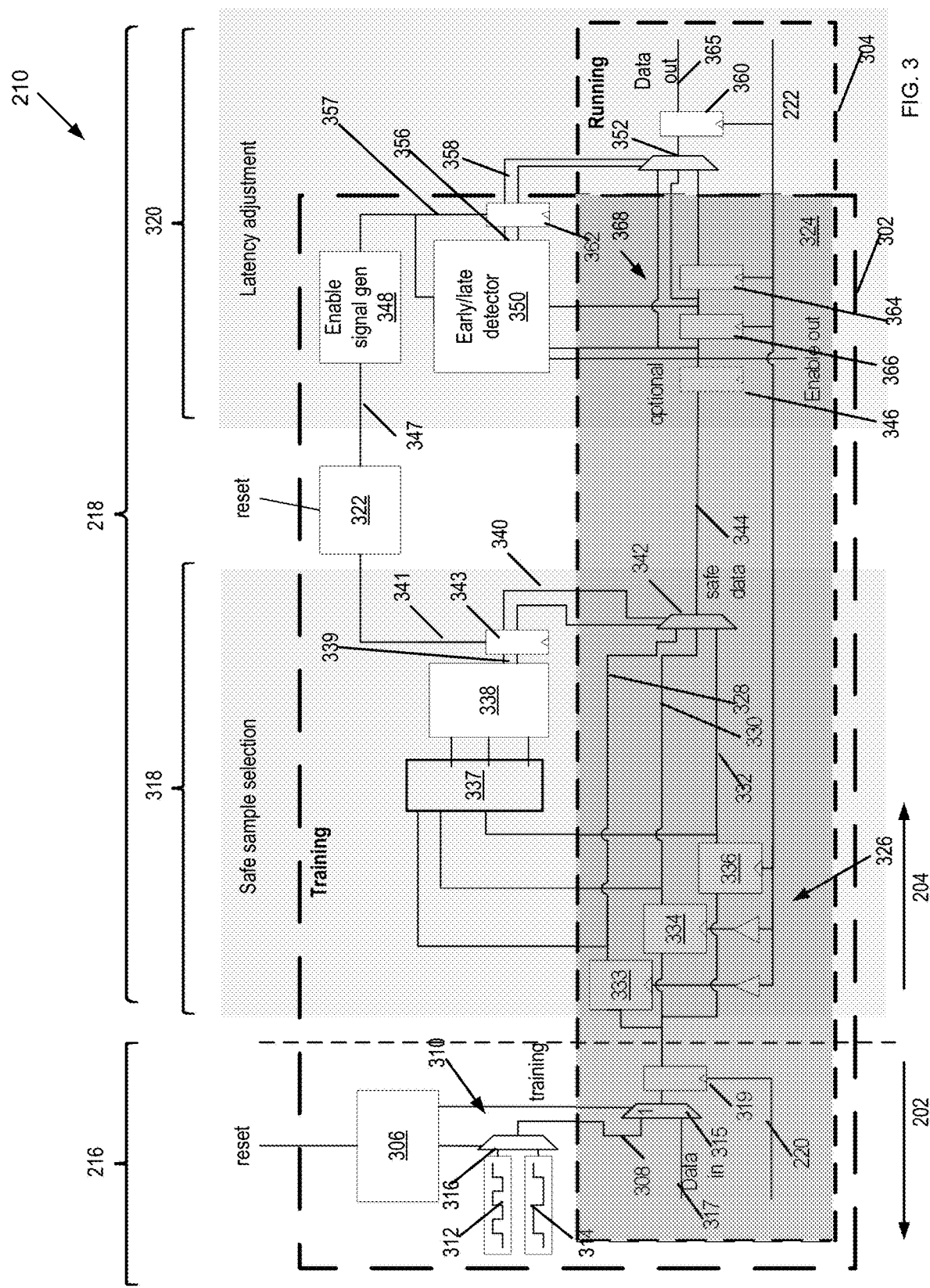
FIG. 3 is a block diagram illustrating an asynchronous inter-die data transfer system according to some embodiments of the present disclosure.

Referring to FIG. 3, illustrated is an example of an asynchronous inter-die data transfer system including a bus 210 with a sender circuit 216 on a die 202 and a receiver circuit 218 on another die 204. The receiver circuit 218 includes a safe sample selection circuit 318 and a latency adjustment circuit 320.

As illustrated in FIG. 3, in some embodiments, the asynchronous bus 210 includes a training portion 302 to perform a training phase for transferring data between two dies. The training portion 302 may use a training controller 306 located on the die 202 to control the sender circuit 216 during the training phase, and use a training controller 322 located on the die 204 to control the receiver circuit 218 during the training phase.

In some embodiments, the asynchronous bus 210 includes a running portion 304 to perform a running phase for transferring data between two dies. The running portion 304 may overlap with the training portion 302 in an overlapping portion 324. Devices in the overlapping portion 324 are included in both the training portion 302 and running portion 304, and may be used in both the training phase and the running phase. In some embodiments, the overlapping portion 324 may also include registers 343 and 362. The register 343 may provide a safe sample selection signal that is trained during the training phase and is then used during the running phase for safe sample selection for the user data. The register 362 may provide a latency adjustment signal that is trained during the training phase and is then used during the running phase for latency adjustment for the user data.

Figure 4:
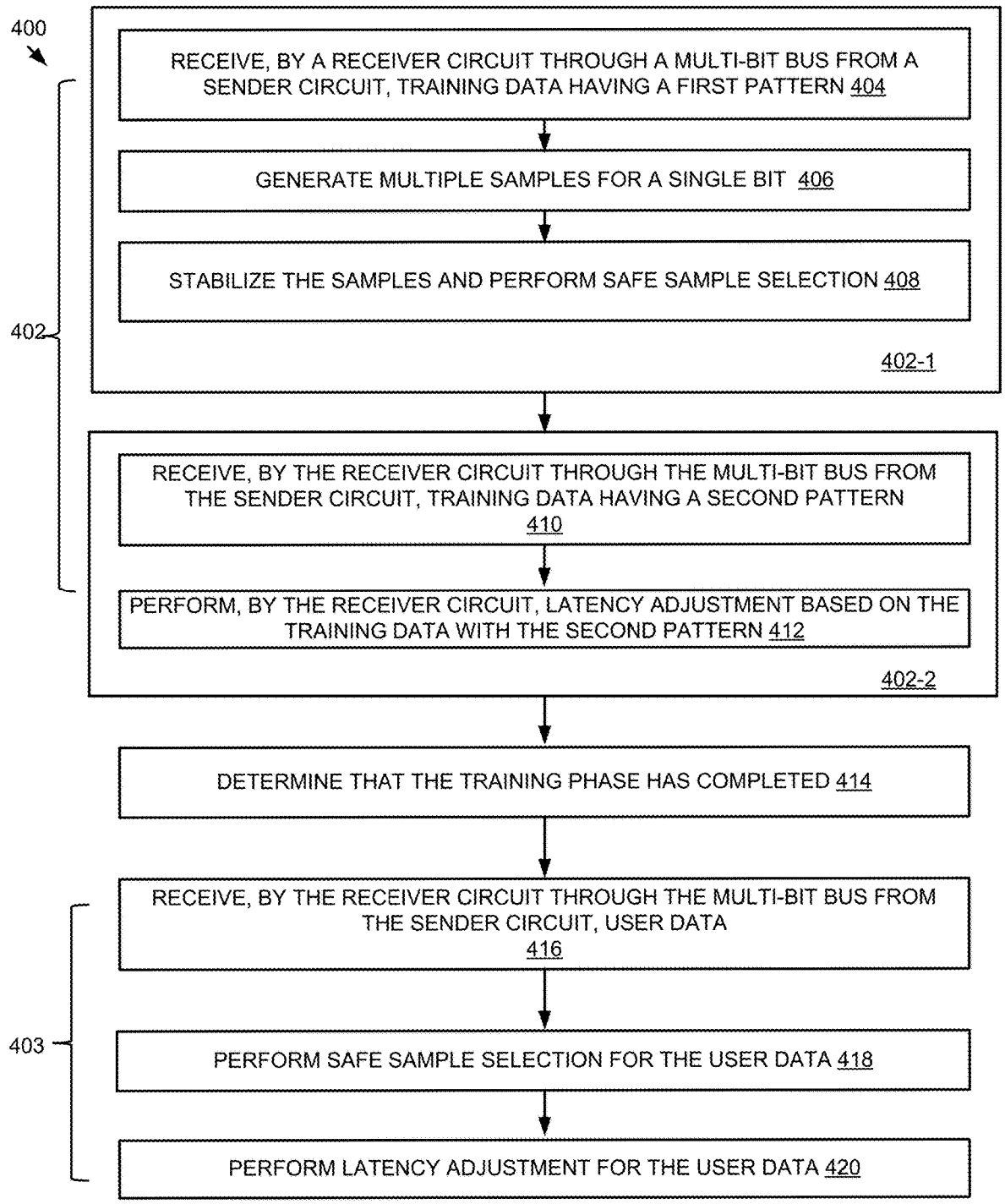
FIG. 4 is a flow chart illustrating a method for inter-die data transfer according to some embodiments of the present disclosure.

Referring to FIG. 4, illustrated is a method 400 for transferring data between two dies asynchronously. The method 400 includes a training phase 402 including a safe sample selection training subsection 402-1 and a latency adjustment training subsection 402-2. The training phase 402 may be performed by the training portion circuit 302 of FIG. 3. The safe sample selection training subsection 402-1 includes blocks 404, 406, and 408. The latency adjustment training subsection 402-2 includes blocks 410, and 412. The method 400 further includes a running phase 403 including blocks 416, 418, and 420. The running phase 403 may be performed by the running portion circuit 304 of FIG. 3.

The method 400 may begin at the safe sample selection training subsection 402-1. A training controller 322 may generate a control signal 341 to start the sample selection training subsection 402-1. During safe sample selection training subsection 402-1, the control signal 341 may provide an enable value of high (e.g., "1") to the register 343, where the safe sample selection signal 340 may be determined based on the output of the training data safe sample selection circuit 338.

The safe sample selection training subsection 402-1 begins at block 404, where a receiver circuit of a receiver die receives training data having a first pattern from a sender circuit of a sender die through a multi-bit bus. Referring to FIG. 3, at block 404, a sender circuit 216 of a die 202 uses a training controller 306 to control a training pulse generator 310 to generate training data signal 308. The training data signal 308 may have one or more predetermined training patterns. Upon initialization (e.g., after receiving a reset signal), the sender circuit 216 may automatically generate the training data signal 308.

In some embodiments, the training controller 306 may control the training pulse generator 310 to generate training data signal 308 having a predetermined training pattern. In the example of FIG. 3, the training pulse generator 310 includes a first pattern generator 312 providing training pulses with a first pattern (e.g., toggling every clock cycle), a second pattern generator 314 providing training pulses with a second pattern (e.g., toggling every two clock cycles), and a multiplexer 316. The multiplexer 316 may receive a select signal from the training controller 306.

In an example, the training data signal 308 has a predetermined training pattern containing two sections. In that example, during the first section of the training pattern, the training data signal 308 toggles every clock cycle (e.g., by selecting the training signal provided by the first pattern generator 312). In the second section of the training pattern, the training data signal 308 toggles every two clock cycles (e.g., by selecting the training signal provided by the second pattern generator 314). As described in detail below, in some embodiments, the first section of the training pattern is used for a first training subsection 402-1 for safe sample selection training, is also referred to as a safe sample selection training subsection 402-1. The second section of the training pattern is used for a second training subsection 402-2 for latency adjustment training, and is also referred to as a latency adjustment training subsection 402-2.

During the training phase 402, the training controller 306 controls a multiplexer 315 such that the training data signal 308 are selected to send to the receiver circuit 218 using a register 319. The register 319 is also referred to as a source register 319, and is clocked by a clock signal 220.

In some embodiments, at block 404, data in the training data signal 308 are pipelined to provide a pipelined training data signal from the sender circuit 216 to the receiver circuit 218. Referring to the example of FIG. 5, the sender circuit 216 of a bus 210 includes a training module 500 that is pipelined to support high frequencies across large bus widths. The training module 500 includes a training pulse generator 310 providing a training data signal 308. Data in the training data signal 308 are pipelined to provide pipelined data in signals 502 and 504 to the receiver circuit 218. In an example, the pipelined data includes the signal 502 associated with a first bit of a bus, and the signal 504 associated with a second bit of the bus.

At block 404, a receiver circuit 218 of the bus 210 receives the training data signal 308 provided by the sender circuit 216 through the bus 210.

The method 400 then proceeds to block 406, where a sampling circuit 326 of the receiver circuit 218 samples the received training data signal 308. In some embodiments, the receiver circuit 218 may sample the training data signal 308 multiple times (e.g., three times in a clock cycle) for each symbol of the training data signal 308. As such, a plurality of samples are generated for the same symbol. Each of the plurality of samples for the same symbol is separated from an adjacent sample by a time that is enough to guarantee that most of those samples for the same symbol are non-metastable. In other words, most of those samples for the same symbol are never metastable, where a metastable sample indicates that that sample may settle at different possible values (e.g., "0" or "1"). In some embodiments, the sampling times of the plurality of samples are determined such that at most one of those samples for the same symbol can be metastable.

Figure 6:
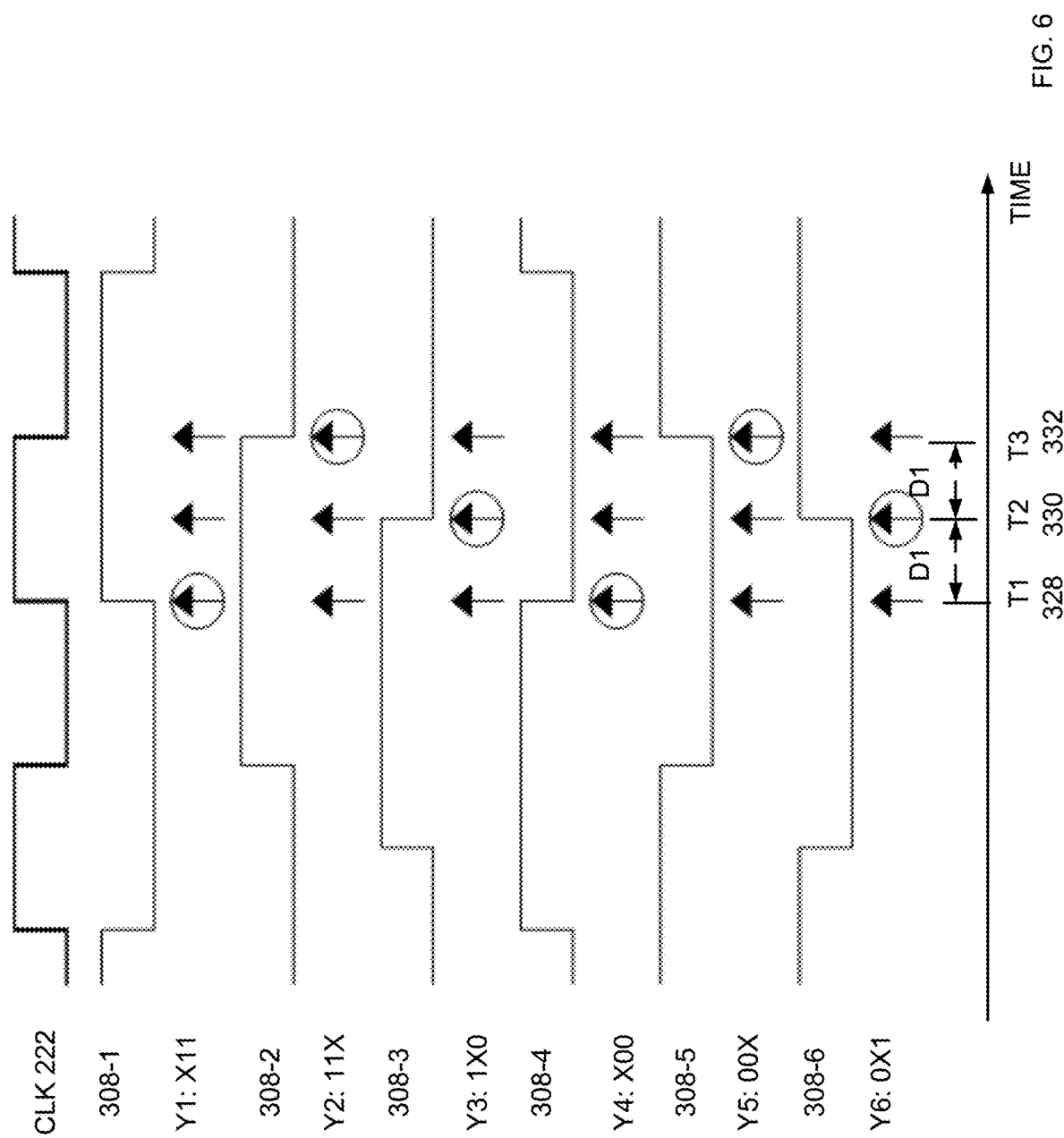
FIG. 6 is a diagram illustrating metastable cases according to some embodiments of the present disclosure.

Referring to FIGS. 3 and 6, at block 406, a sampling circuit 326 of FIG. 3 samples the received training data signal 308. The sampling circuit 326 includes registers 333, 334, and 336 for generating three samples 328, 330, and 332 for each symbol of the training data signal 308 respectively. Each of the samples 328, 330, and 332 for the same symbol is separated from an adjacent sample by a time that is enough to guarantee that most of (e.g., two out of three) those samples are non-metastable. In other words, at most one of those three samples 328, 330, and 332 of the same symbol can be metastable.

Referring to FIG. 6, for each symbol, three samples 328, 330, and 332 are generated at times T1, T2, and T3 respectively. In such examples, there are six possible metastability cases Y1, Y2, Y3, Y4, Y5, and Y6 that metastability may occur. Those possible metastability cases Y1 through Y6 correspond to training data signal 308-1 through 308-6 respectively. For example, in metastability case Y1, samples 328, 330, and 332 for training data signal 308-1 correspond to a state of "X11." In Y1, sample 328 has a corresponding state "X," indicating that sample 328 is metastable and may settle at either "0" or "1." On the other hand, in Y1, samples 330 and 332 are non-metastable and have values "1" and "1" respectively. Similarly, in metastability case Y2, sample 332 is metastable, and samples 328 and 330 are non-metastable and have values "1" and "1" respectively. In metastability case Y3, sample 330 is metastable, and samples 328 and 332 are non-metastable and have values "1" and "0" respectively. In metastability case Y4, sample 328 is metastable, and samples 330 and 332 are non-metastable and have values "0" and "0" respectively. In metastability case Y5, sample 332 is metastable, and samples 328 and 330 are non-metastable and have values "0" and "0" respectively. In metastability case Y6, sample 330 is metastable, and samples 328 and 332 are non-metastable and have values "1" and "0" respectively.

As shown in FIG. 6, each of the samples 328, 330, and 332 for the same symbol is separated from an adjacent sample by a time D1 that is enough to guarantee that most of (e.g., two out of three) those samples are non-metastable. In some embodiments, D1 is greater than a combined time of $t_{setup}$ and $t_{hold}$, where $t_{setup}$ is the setup time of the sampling register (e.g., register 333, 334, or 336), and $t_{hold}$ is the hold time of the sampling register (e.g., register 333, 334, or 336).

The method 400 may then proceed to block 408, where the samples are stabilized, and safe sample selection is performed to the stabilized samples. In the example of FIG. 3, the samples 328, 330, and 332 are fed to a stabilizer circuit 337. The stabilizer circuit 337 may stabilize the samples 328, 330, and 332, and generate stabilized samples. The stabilizer circuit 337 may include multi-stage synchronizer flip-flops or threshold logic, which are used to produce valid binary values associated with the samples 328, 330, and 332, except once every mean time between failure (MTBF). In an example, the stabilizer circuit 337 may include a plurality of stages, each stage uses a delay element (e.g., an edge sensitive flip-flop) to obtain valid binary values from 328, 330, 332 even when they are metastable. The MTBF may be increased/decreased by adding/removing one or more stages (e.g., flip-flops) to the stabilizer circuit 337. It is noted that adding more stages in the stabilizer circuit 337 to increase the MTBF may not increase the latency of the inter-die data transfer, because the added latency by the additional stages is incurred only during the training phase. Because the data path of the running phase does not go through the stabilizer circuit 337, the MTBF of the stabilizer circuit 337 applies to the training phase only, and does not apply to the running phase.

At block 408, safe sample selection is performed. In the example of FIG. 3, a training data safe sample selection circuit 338 of the receiver circuit 218 receives the stabilized samples from stabilizer circuit 337, and selects safe samples. In an example, the training data safe sample selection circuit 338 uses the received training data signal to select a safe sample signal, and then drives that selected safe sample signal as output, which is guaranteed to be free of metastability. As discussed in detail below, because of the varied selection of safe samples between bus bits of the bus 210, the bus bits are inter-aligned to maintain bus signal validity, e.g., by latency adjustment.

Figure 7:
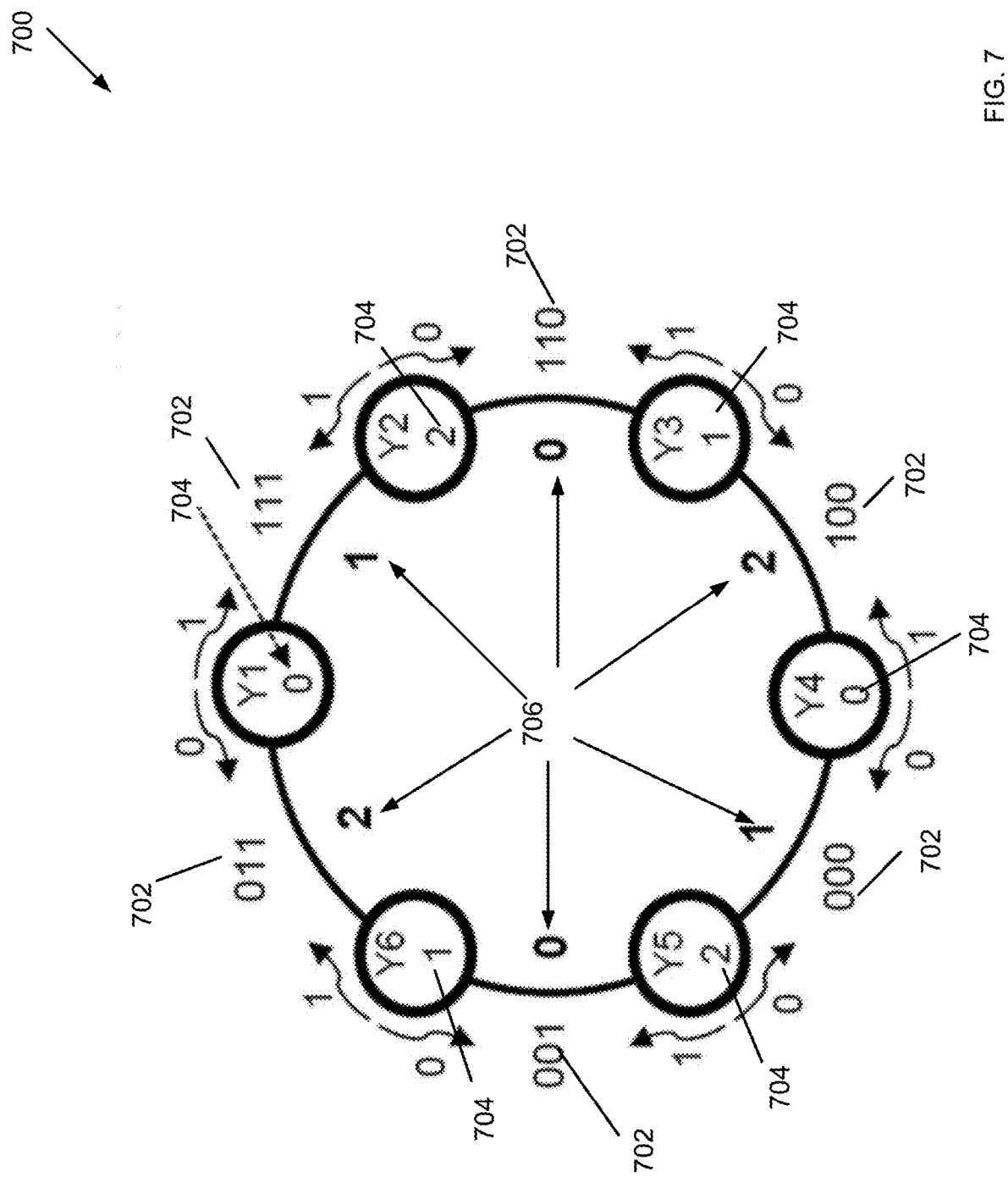
FIG. 7 is another diagram illustrating metastable cases according to some embodiments of the present disclosure.

Referring to FIG. 7, training data safe sample selection is illustrated. In the example of FIG. 7, because a metastable sample may settle at either 0 or 1, each of the metastability cases Y1 through Y6 may have two possible minterms depending on which value ("0" or "1") that the metastable sample settles at. The relation of these metastability cases Y1 through Y6 and corresponding minterms are illustrated in diagram 700. The metastable sample position 704 indicates a metastable sample's position (e.g., 0, 1, and 2 corresponding to samples 328, 330, and 332 respectively) in a metastability case Y. As shown in FIG. 7, a particular observed minterm 702 (e.g., after the metastable sample in the metastability case settles) may arise from two metastability cases, which creates dependency in the safe sample selection. For example, an observed minterm 702 having values "011" may arise from the metastability case Y1 (e.g., after its metastable sample at metastable sample position 704 (e.g., 0) settles at "0") or from the metastability case Y6 (e.g., after its metastable sample at metastable sample position 704 (e.g., 1) settles at "1").

As shown in diagram 700, there is an assignment from an observed minterm to a selected safe sample. A training data safe sample selection circuit 338 may determine a safe sample location 706 based on the observed minterm. In an example of metastability case Y1, the safe sample location 706 has a value of 2 if a metastable sample at metastable sample position 704 (having a value of 0) settles at "0," and has a value of 1 if that metastable sample settles at "1." In an example of metastability case Y2, the safe sample location 706 has a value of 0 if a metastable sample at metastable sample position 704 (having a value of 2) settles at "0," and has a value of 1 if that metastable sample settles at "1." In an example of metastability case Y3, the safe sample location 706 has a value of 2 if the metastable sample at metastable sample position 704 (having a value of 1) settles at "0," and has a value of 0 if that metastable sample settles at "1." In an example of metastability case Y4, the safe sample location 706 has a value of 1 if the metastable sample at metastable sample position 704 (having a value of 0) settles at "0," and has a value of 2 if that metastable sample settles at "1." In an example of metastability case Y5, the safe sample location 706 has a value of 1 if the metastable sample at metastable sample position 704 (having a value of 2) settles at "0," and has a value of 0 if that metastable sample settles at "1." In an example of metastability case Y6, the safe sample location 706 has a value of 0 if the metastable sample at metastable sample position 704 (having a value of 1) settles at "0," and has a value of 2 if that metastable sample settles at "1." The training data safe sample selection circuit 338 may then select the sample at the safe sample location 706 (e.g., 0, 1, and 2 corresponding to samples 328, 330, and 332 respectively) as the safe sample.

In some embodiments, at block 408, the training data safe sample selection circuit 338 provides a safe sample selection signal 339 including the safe sample location 706 to a safe sample selection signal register 343. At block 408, the safe sample selection signal register 343 receives an enable signal 341 having a high value. As such, the safe sample selection signal register 343 outputs safe sample selection signal 340 based on the safe sample selection signal 339. A multiplexer 342 selects the safe sample (e.g., one of samples 328, 330, and 332) corresponding to that safe sample location 706 using the safe sample selection signal 340.

After safe sample selection phase, 341 have a low value and 340 may be maintained to be used during latency adjustment and running phases.

In some embodiments, the training controllers (e.g., training controller 306 located on the die 202 and training controller 322 on the die 204) determine that the safe sample selection training subsection 402-1 has completed, and begin the latency adjustment training subsection 402-2. In an example, the training controller 306 (e.g., using a counter on the die 202) determines that the required number of training cycles of safe sample selection training subsection 402-1 has completed. The training controller 306 may then control the sender circuit 216 to start the latency adjustment training subsection 402-2. For example, the training controller 306 may then control the sender circuit 216 to generate a training data signal 308 having a second pattern (e.g., pattern 314) for the latency adjustment training subsection 402-2.

Similarly, the training controller 322 (e.g., using a counter on the die 204) determines that the required number of training cycles of safe sample selection training subsection 402-1 has completed. In an example, the training controller 322 may then send the control signal 341 (e.g., using a low value ("0") to the enable input of the safe sample selection register 343) to stop the safe sample section training. In that example, after the safe sample section training is stopped, during latency adjustment training subsection 402-2 and the running phase, the safe sample selection signal 340 may maintain the same value as provided by the safe sample selection register 343, and may not change based on the output of the training data safe sample selection circuit 338. Further, the training controller 322 may use a control signal 347 to start the latency adjustment training subsection 402-2.

By using training controllers on dies 202 and 204 respectively, a handshake between dies 202 and 204 for training subsection completion may not be needed, which improves throughput.

The method 400 may proceed to block 410 of the latency adjustment training subsection 402-2, where the receiver circuit receives, through the multi-bit bus from the sender circuit, training data having a second pattern for latency adjustment. As discussed above, upon determination of the completion of the safe sample section training subsection 402-1, the sender circuit 216 switches to generate a training data signal 308 having a second pattern (e.g., toggles every two or more clock cycles using the second pattern generator 314) for the latency adjustment training subsection 402-2. Such training pulses prolonged to last for two or more clock cycles may enable relative comparisons (e.g., early, late, or aligned) among safe sample signals of different bits of the bus, which allows misalignment detection and correction.

The method 400 may proceed to block 412, where the receiver circuit performs latency adjustment based on the training data having the second pattern. For different bits of the bus 210, the safe sample selection may be different. For example, for a bit of the bus 210, one of the samples 328, 330, and 332 may be selected as the safe sample, while for another bit of the bus 210, another of the samples 328, 330, and 332 may be selected as the safe sample. Because each bit of the bus may have a different wire delay and a different delay caused by the different safe sample selection, latency adjustment is performed to align the selected safe samples of the bus bits to maintain bus signal validity.

In the example of FIG. 3, the latency adjustment circuit 320 of the receiver circuit 218 includes an enable signal generator 348, which generates a latency adjustment enable signal based on a control signal 347 from the training controller 322. The control signal 347 may be used to start or stop the latency adjustment training subsection 402-2. The latency adjustment circuit 320 may further include an early/late detector 350 that detects and corrects the misalignment in the bits on the bus. Such adjustment may be accomplished by selecting an output from the correct flip-flop (e.g., one of the flip-flops 346, 364, 366 in a delay pipeline 368) using a multiplexer 352 and a latency adjustment signal 358. The register 362 may provide a latency adjustment signal 358 that is trained during the training phase and maintain latency adjustment signal 358 at the same value to be used during the running phase for latency adjustment for the user data.

Figure 8:
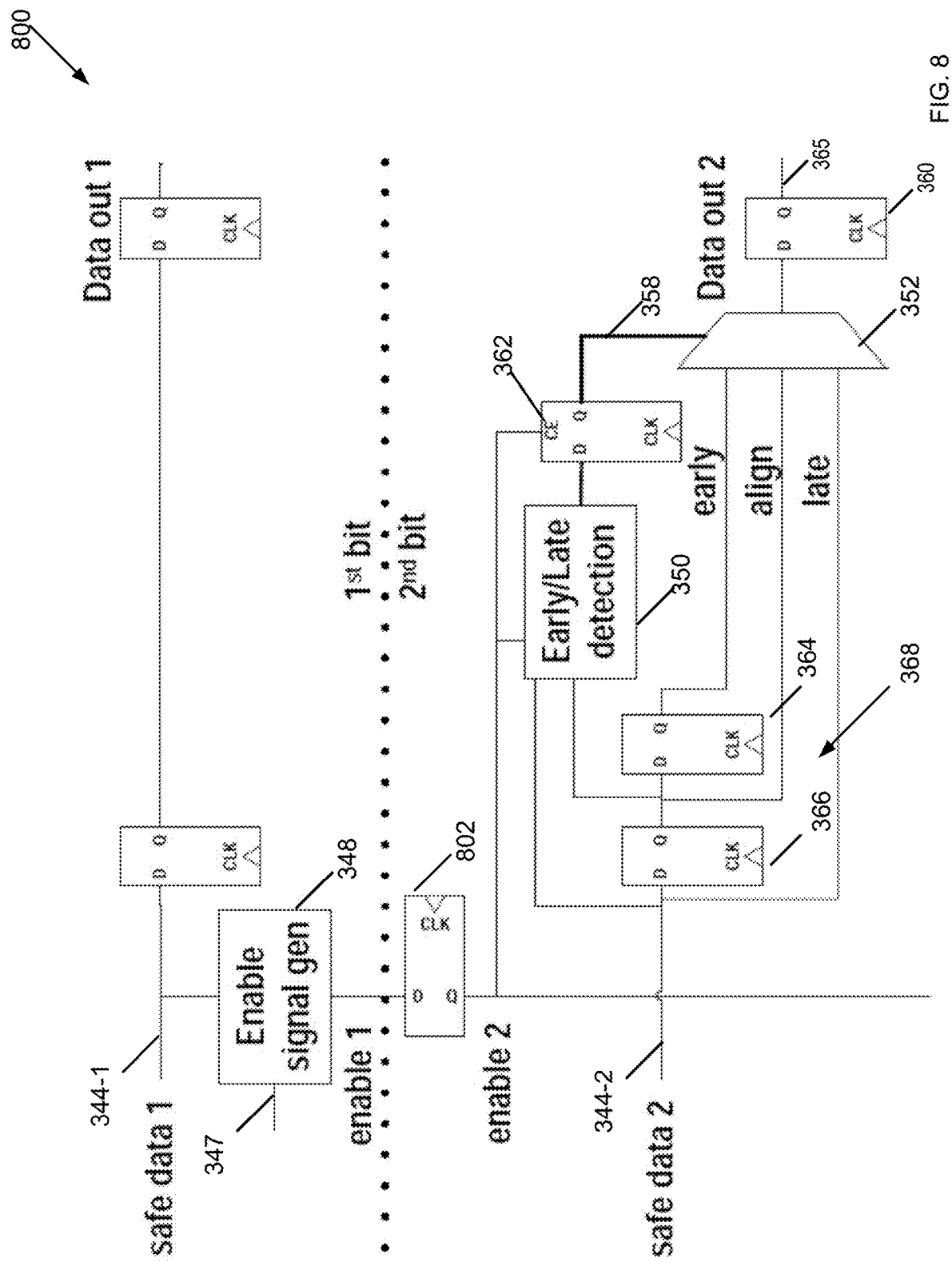
FIG. 8 is a diagram illustrating a latency adjustment circuit according to some embodiments of the present disclosure.

Referring to FIG. 8, illustrated is an example latency adjustment circuit 800, which may be used as the latency adjustment circuit 320 of FIG. 3. In the latency adjustment circuit 800, the safe data 344 for each bit of the bus is aligned with the safe data of a reference bit (e.g., the least significant bit (LSB) of the bus 210) of the bus. In the example of FIG. 8, the early/late detector 350 uses the least significant bit (LSB) (e.g., signal 344-1) of the bus 210 as a reference, and all other bits of the bus (e.g., signal 344-2) are adjusted accordingly using that reference.

Figure 9:
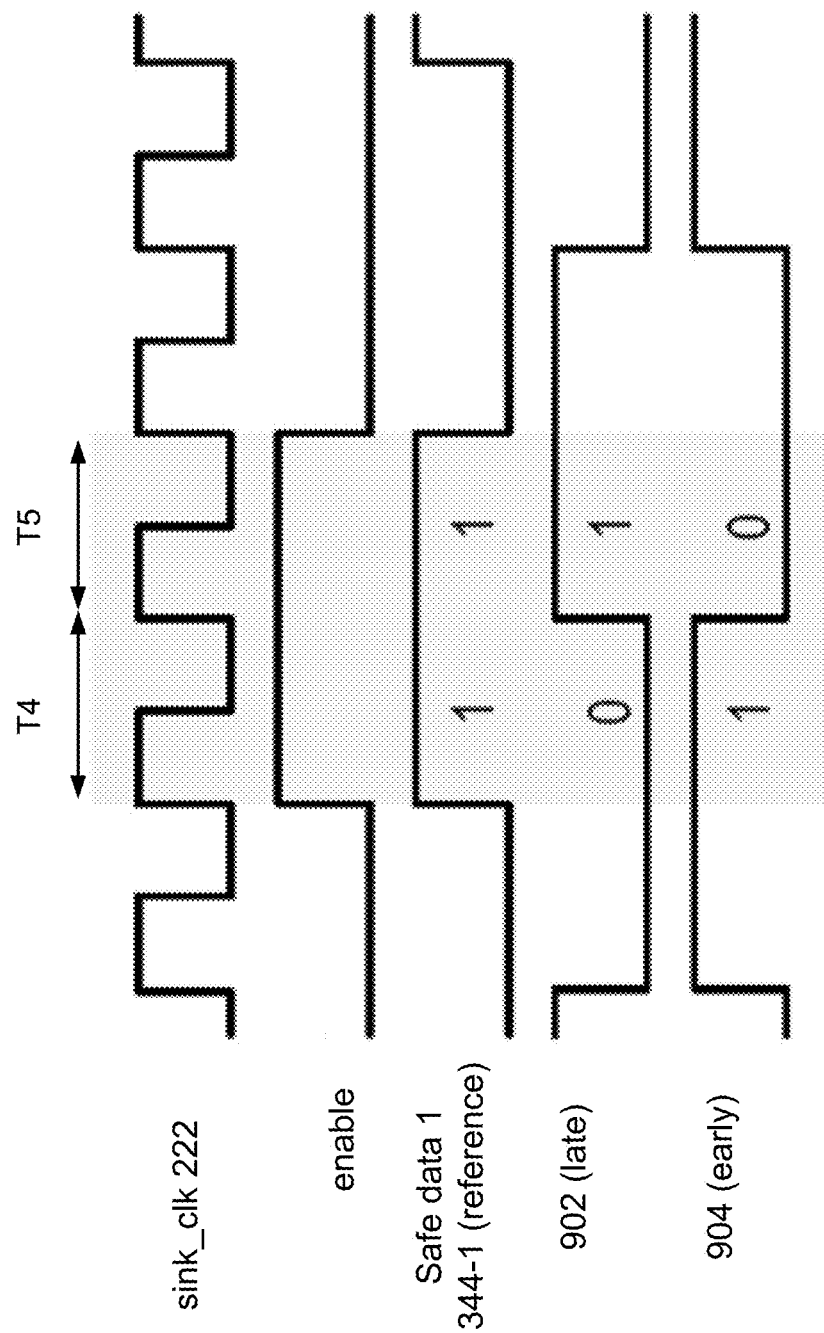
FIG. 9 is a diagram illustrating waveforms for latency adjustment according to some embodiments of the present disclosure.

Referring to FIG. 9, illustrated are waveforms of signals of the latency adjustment circuit of FIG. 8. In the example of FIG. 9, it is assumed that there is no edge sensitive flip-flops on the enable signal. In an example, the preceding bits produce an alignment value on the pipelined flip-flops 364 and 366 of the delay pipeline 368, which indicates that they are aligned with the first bit. In another example, a pattern other than the alignment value is detected. In that example, the bit being compared is either early or late, and is adjusted accordingly using a multiplexer 352 (e.g., by selecting the output from the corresponding flip-flops 364 and 366).

Figure 5:
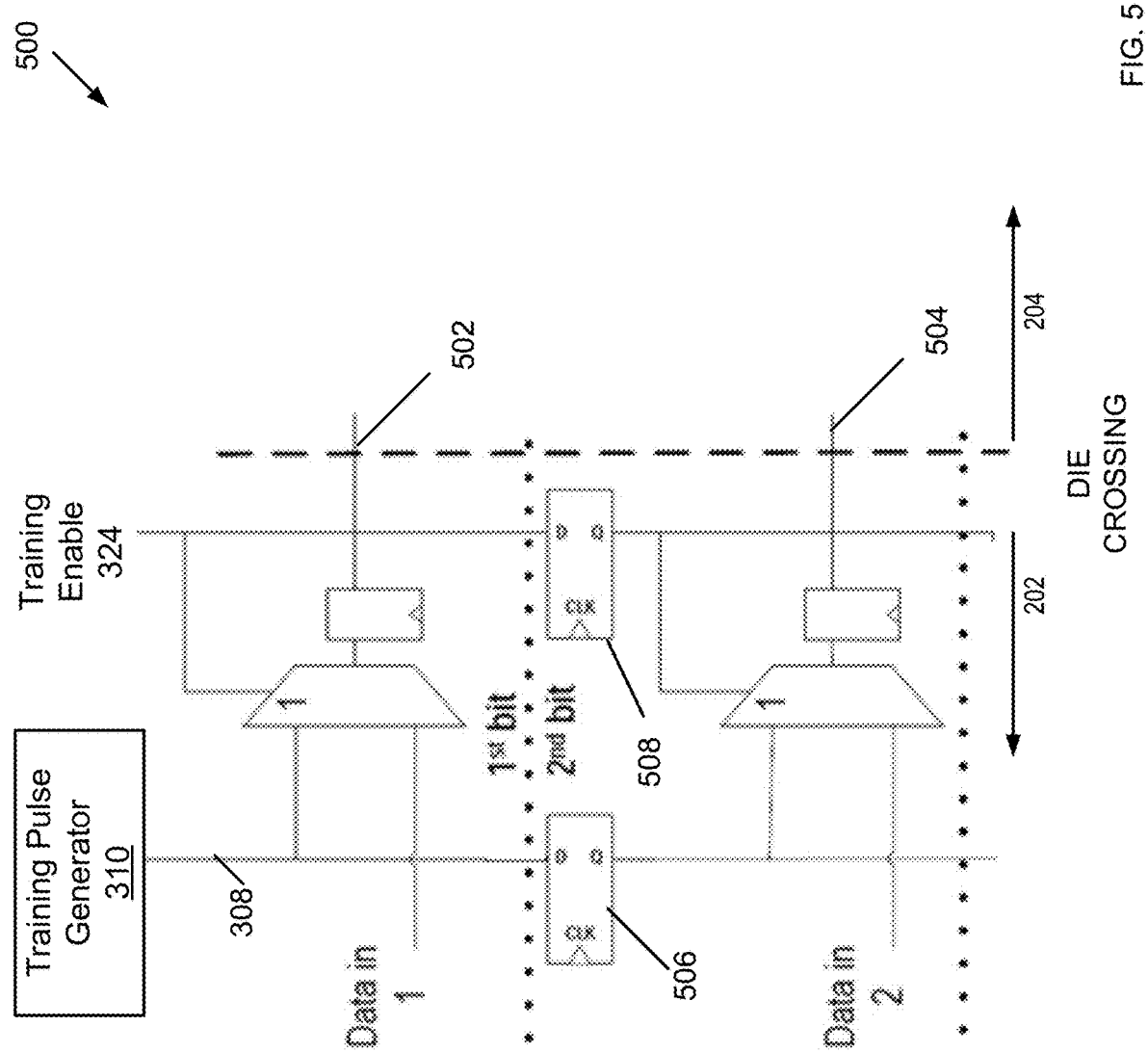
FIG. 5 is a block diagram illustrating a sender circuit of an inter-die data transfer system according to some embodiments of the present disclosure.

In some embodiments, various techniques may be used to ensure correct enablement of alignment detection across all bits of the bus. For example, the enable signal may be pipelined for timing closure of a bus with a large width (e.g., a 1024-bit bus). This may introduce latencies between the comparative bits of the bus. To counter balance this effect, the training pulses generated by the sender circuit are also intentionally offset by a single cycle from each other (e.g., as shown in FIG. 5). In some embodiments, a comparison can be done against a shifted version of the reference (e.g., as shown in FIG. 8 using a delay element 802).

Referring to FIG. 9, illustrated are waveforms of signals of the latency adjustment circuit 320 of FIG. 8. As shown in FIG. 9, the safe data 1 of signal 344-1 corresponds to the LSB of bus 210, and is used as a reference. As shown in FIG. 9, during the latency adjustment training subsection 402-2, the training data include training pulses that are prolonged to last for two or more clock cycles (e.g., T4 and T5), which allows enable relative comparisons between safe data 344-1 of the LSB of the bus 210 and safe data of other bits of the bus 210. For example, the safe data 902 of another bit of the bus 210 is determined by the early/late detector 350 to be late, and the safe data 904 of yet another bit of the bus 210 is determined by the early/late detector 350 to be early.

The method 400 may then proceed to block 414, where it is determined that the training phase 402 has completed. In some embodiments, the training controllers (e.g., training controller 306 located on the die 202 and training controller 322 on the die 204) determine that the training phase 402 has completed after determining that the latency adjustment training subsection 402-2 has completed. In an example, the training controller 306 (e.g., using a counter on the die 202) determines that the required number of training cycles of latency adjustment training subsection 402-2 has completed. The training controller 306 may then control the sender circuit 216 to switch to select the user data as its output data. Similarly, the training controller 322 (e.g., using a counter on the die 204) determines that the required number of training cycles of latency adjustment subsection 402-2 has completed. In an example, the training controller 322 may use a control signal 347 to stop the latency adjustment training subsection 402-2, e.g., by sending an enable signal with a low value to various components including a register 362.

In another example, the training controller 322 uses a control signal 347 to start the latency adjustment. In response, the enable signal generator will generate one pulse of two or more clock cycles depending on the training pattern. Once the enable pulse arrives at a particular bit, it enables latency difference detection. When the pulse passes (having value "0"), the detection result remains. The arrival of the pulse at the end of the pipeline indicates that the latency adjustment phase is completed.

Figure 11:
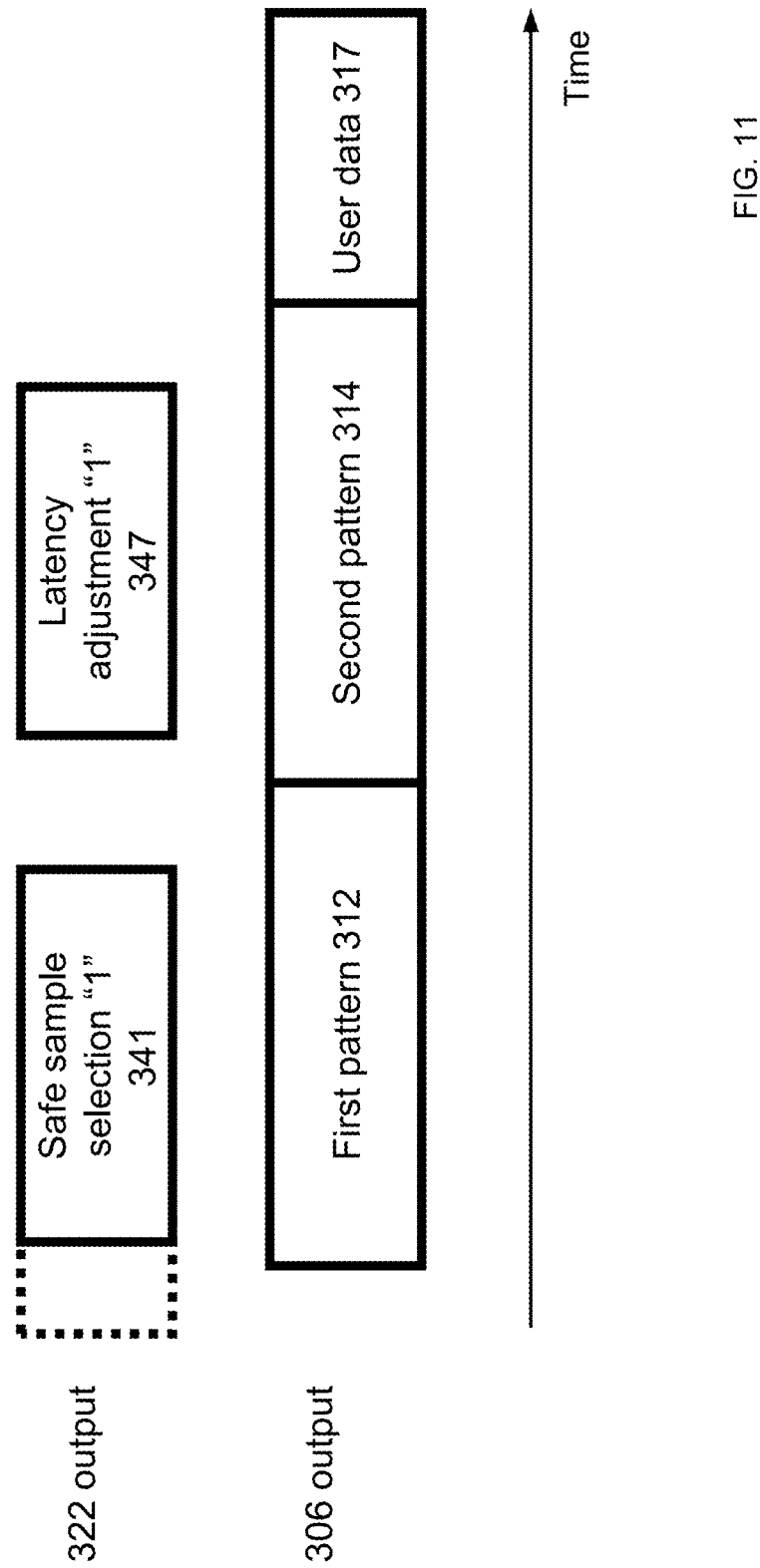
FIG. 11 is a diagram illustrating the timing relationship between the sender circuit and the receiver circuit according to some embodiments of the present disclosure.

By using training controllers on dies 202 and 204 respectively, a handshake between dies 202 and 204 for training completion may not be needed, which improves throughput. Referring to FIG. 11, the timing relation between sender and receiver sides may be very loose. The system will work properly as long as safe sample selection and latency adjustment are performed while the first and second pattern training data are transmitted, respectively. The duration of each of the patterns 312 and 314 may be conservatively set on the sender circuit 216 to meet the requirement.

In another example where the sender circuit 216 determines that the generated training pulses have reached the required number of training cycles, the sender circuit 216 may determine that the training phase 402 has completed, and start the running phase 403.

The method 400 may then enter the running phase 403, and proceed to block 416, where the receive circuit receives, through a multi-bit bus from the sender circuit, user data (e.g., user data signal 317 selected by multiplexer 315). The method 400 may then proceed to block 418, where safe sample selection is performed to the user data. In the example of FIG. 3, the safe sample selection circuit 216 performs safe sample selection to samples generated from the user data, using the safe sample selection signal 340 that is maintained and provided by the register 343. At block 418, the stabilizer circuit 337 and the training data safe sample selection circuit 338 are not used. As such, the stages of the stabilizer circuit 337 does not affect the latency in the running phase 403.

The method 400 may then proceed to block 420, where latency adjustment is performed for the selected safe samples of the user data. Referring to FIG. 3, latency adjustment is performed to the selected safe samples of all bits of the bus. After those safe samples are aligned, they are provided in a user data output signal 363 through a register 360.

Figure 10:
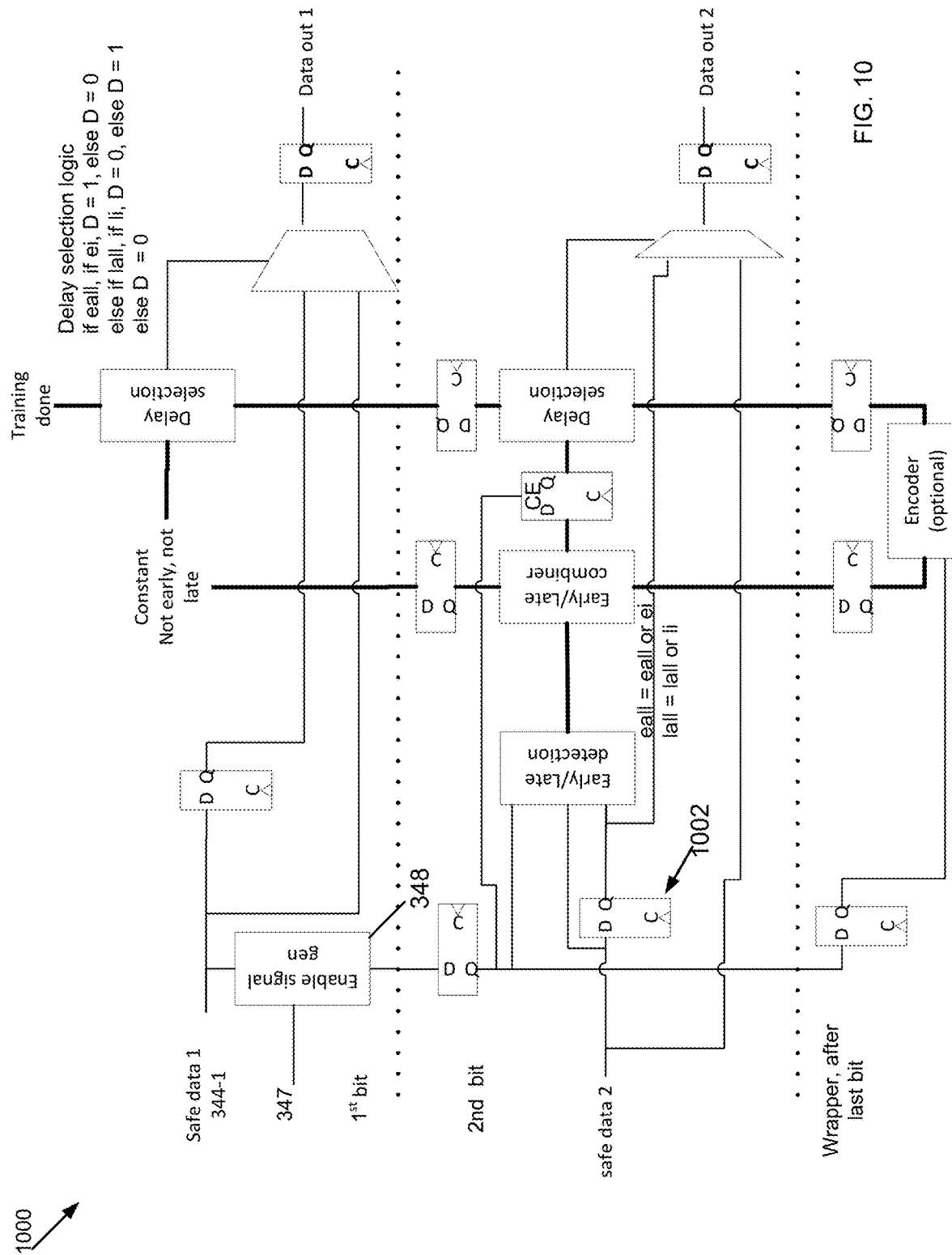
FIG. 10 is a diagram illustrating a latency adjustment circuit according to some embodiments of the present disclosure.

Referring to FIG. 10, illustrated is an example latency adjustment circuit 1000, which may be used as the latency adjustment circuit 320 of FIG. 3. Compared with latency adjustment circuit 800 of FIG. 8, latency adjustment circuit 1000 may reduce the latency. In the example of FIG. 10, safe data for a first bit (e.g., LSB) 344-1 of the bus 210 is allowed to be shifted/delayed as well, and is not used itself as a reference for alignment. In that example, the worst case drift between any two bits (including the first bit) falls to only a single cycle. Therefore, a single flip-flop delay element 1002 may be utilized across all of the flops, compared with the use the two flip-flops 364 and 366 of FIG. 8. As such, the data path latency at run time of latency adjustment circuit 1000 is reduced by a single cycle compared to latency adjustment circuit 800 of FIG. 8.

On the other hand, latency adjustment circuit 1000 may take longer training time than the latency adjustment circuit 800 of FIG. 8. First, all bits of the bus 210 are compared to each other on a downward path from the LSB to the most significant bit (MSB) to determine their local alignment variations compared to the reference bit and the global overall offset information. Then another round of actual delay adjustments based on the global overall offset information is performed on an upward path from the MSB to the LSB. As such, latency adjustment circuit 1000 may take twice the training time upon initialization compared to the latency adjustment circuit 800 of FIG. 8.

In some embodiments, the sender circuit 216 may provide each bit with its own training pulse generator 310. For example, in a hardened implementation, the first bit of any individual bus may not be known ahead of time. Thus, each bit has its own training pulse generator 310 such that each bit may become the first bit of an individual bus. Analogously, in the receiver circuit 218, each bit may have its own training enable signal generator 348 because each bit may become the first bit of an individual bus. In another example, the circuit can be arranged into a group of bits (e.g., 8 bits), so that only one pulse generator 310 and training enable signal generator 348 may be provided once per each big group. A large bus may be built by cascading such groups.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. An inter-die data transfer system, comprising:
a receiver circuit in a receiver die, wherein the receiver circuit includes:
  a safe sample selection circuit configured to:
    receive, through a bus from a sender circuit in a sender die, a plurality of training data signals corresponding to a plurality of bits of the bus respectively;
    determine a safe sample selection signal based on a first training data signal corresponding to a first bit of the bus;
    receive, through the bus, a plurality of user data input signals from the sender circuit corresponding to the plurality of bits of the bus respectively; and
    select, using the safe sample selection signal, a user data safe sample from a plurality of user data samples for a first user data input signal associated with the first bit of the bus;
  a latency adjustment circuit configured to:
    determine a latency adjustment selection signal associated with the first bit of the bus based on the plurality of training data signals; and
    perform latency adjustment to the user data safe sample to generate a first user data output signal using the latency adjustment selection signal.

2. The inter-die data transfer system of claim 1, wherein the safe sample selection circuit further includes:
a sampling circuit configured to:
sample a first training data symbol of the first training data signal at a plurality of sampling times to generate a plurality of training data samples;
wherein the safe sample selection signal is determined using the plurality of training data samples.

3. The inter-die data transfer system of claim 2, wherein the plurality of sampling times includes a first sampling time and a second sampling time adjacent to the first sampling time, and
wherein a first time period between the first and second sampling times is determined based on a metastability limitation of the plurality of training data samples.

4. The inter-die data transfer system of claim 3, wherein at most one of the plurality of training data samples is metastable.

5. The inter-die data transfer system of claim 3, wherein the sampling circuit includes a first register configured to generate a first training data sample at the first sampling time, and
wherein the first time period is greater than a combined time of a setup time of the first register and a hold time of the first register.

6. The inter-die data transfer system of claim 2, wherein the safe sample selection circuit includes:
a stabilizer circuit configured to stabilize the plurality of training data samples to generate a plurality of stabilized training data samples;
wherein the safe sample selection signal is determined using the plurality of stabilized training data samples.

7. The inter-die data transfer system of claim 6, wherein the stabilizer circuit includes:
a plurality of delay elements connected in serial to obtain valid binary values of the plurality of training data samples.

8. The inter-die data transfer system of claim 1, wherein the safe sample selection signal is determined based on the first training data signal having a first pattern, and
wherein the latency adjustment selection signal is determined based on the first training data signal having a second pattern.

9. The inter-die data transfer system of claim 8, wherein the first pattern toggles once every clock cycle; and
wherein the second pattern toggles once every two or more clock cycles.

10. The inter-die data transfer system of claim 1, wherein the latency adjustment circuit is configured to:
receive a first training data safe sample for a first training data symbol of the first training data signal;
receive a second training data safe sample for a second training data symbol of a second training data signal corresponding to a second bit of the bus; and
determine the latency adjustment selection signal by detecting a latency difference between the first training data safe sample and the second training data safe sample.

11. A method, comprising:
receiving, by a receiver circuit in a receiver die through a bus from a sender circuit in a sender die, a plurality of training data signals corresponding to a plurality of bits of the bus respectively;
determining, by a safe sample selection circuit of the receiver circuit, a safe sample selection signal based on a first training data signal corresponding to a first bit of the bus;
determining a latency adjustment selection signal associated with the first bit of the bus based on the plurality of training data signals;
receiving, by the receiver circuit through the bus from the sender circuit, a plurality of user data input signals corresponding to the plurality of bits of the bus respectively;
selecting, using the safe sample selection signal, a user data safe sample from a plurality of user data samples for a first user data input signal associated with the first bit of the bus; and
performing latency adjustment to the user data safe sample to generate a first user data output signal using the latency adjustment selection signal.

12. The method of claim 11, wherein the determining the safe sample selection signal further includes:
sampling a first training data symbol of the first training data signal at a plurality of sampling times to generate a plurality of training data samples;
wherein the safe sample selection signal is determined using the plurality of training data samples.

13. The method of claim 12, wherein the plurality of sampling times includes a first sampling time and a second sampling time adjacent to the first sampling time, and
wherein a first time period between the first and second sampling times is determined based on based on a metastability limitation of the plurality of training data samples.

14. The method of claim 13, wherein at most one of the plurality of training data samples is metastable.

15. The method of claim 13, wherein a first register is configured to generate a first training data sample at the first sampling time, and
wherein the first time period is greater than a combined time of a setup time of the first register and a hold time of the first register.

16. The method of claim 12, wherein the determining the safe sample selection signal further includes:
stabilizing the plurality of training data samples to generate a plurality of stabilized training data samples;
wherein the safe sample selection signal is determined using the plurality of stabilized training data samples.

17. The method of claim 16, wherein the stabilizing the plurality of training data samples includes:
obtaining valid binary values of the plurality of training data samples using a plurality of delay elements connected in serial.

18. The method of claim 11, wherein the safe sample selection signal is determined based on the first training data signal having a first pattern, and
wherein the latency adjustment selection signal is determined based on the first training data signal having a second pattern.

19. The method of claim 18, wherein the first pattern toggles once every clock cycle; and
wherein the second pattern toggles once every two or more clock cycles.

20. The method of claim 11, wherein the determining the latency adjustment selection signal includes:
receiving a first training data safe sample for a first training data symbol of the first training data signal;
receiving a second training data safe sample for a second training data symbol of a second training data signal corresponding to a second bit of the bus; and determining the latency adjustment selection signal by detecting a latency difference between the first training data safe sample and the second training data safe sample.

* * * * *